United States Patent [19]

Neubauer et al.

[11] Patent Number: 5,834,720
[45] Date of Patent: Nov. 10, 1998

[54] STEERING COLUMN SWITCH IN THE FORM OF A GEAR SHIFT MECHANISM THAT CAN BE FIXED IN THE NEUTRAL POSITION

[75] Inventors: Walter Neubauer; Rudolf Klein, both of Lauffen, Germany

[73] Assignee: ITT Manufacturing Enterprises Inc., Wilmington, Del.

[21] Appl. No.: 809,474

[22] PCT Filed: Sep. 8, 1995

[86] PCT No.: PCT/EP95/03531

§ 371 Date: Jun. 16, 1997

§ 102(e) Date: Jun. 16, 1997

[87] PCT Pub. No.: WO96/09187

PCT Pub. Date: Mar. 28, 1996

[30] Foreign Application Priority Data

Sep. 21, 1994 [DE] Germany ............................ 44 33 595.4

[51] Int. Cl.⁶ ..................................................... H01H 21/36
[52] U.S. Cl. ........................ 200/61.54; 200/4; 200/61.27
[58] Field of Search ...................... 74/335, 47 R, 74/483 K, 475, 476, 491; 192/3.56, 3.58, 4 A; 200/4, 17 R, 18, 61.27, 61.28, 61.54, 61.85, 61.87, 61.88, 61.91, 566, 332, 335

[56] References Cited

U.S. PATENT DOCUMENTS

| | | | |
|---|---|---|---|
| 4,022,078 | 5/1977 | Malott | 74/475 |
| 4,805,476 | 2/1989 | Beauch et al. | 74/473 SW |
| 4,949,830 | 8/1990 | Kemner et al. | 192/92 |
| 4,987,792 | 1/1991 | Mueller et al. | 74/473 R |
| 5,216,399 | 6/1993 | Kamada et al. | 335/190 |
| 5,600,110 | 2/1997 | Neubauer | 200/61.54 |

FOREIGN PATENT DOCUMENTS

| | | | |
|---|---|---|---|
| 2219031 | 9/1979 | France | B60Q 1/00 |
| 2432873 | 1/1976 | Germany . | |
| 3040903 | 5/1981 | Germany | H01H 25/04 |
| 3906965 | 9/1990 | Germany | H01H 25/04 |
| 3942925 | 6/1991 | Germany | H01H 25/04 |
| WO 8809451 | 12/1988 | WIPO | F16H 5/36 |
| WO 9221899 | 12/1992 | WIPO | F16H 61/16 |
| WO 9609187 | 3/1996 | WIPO | B60Q 1/14 |

OTHER PUBLICATIONS

English Translation of the International Preliminary Examination Report of Appl. No. PCT/EP95/03531.
Search Report of the German Patent Office for Application P4433595.4.

*Primary Examiner*—Michael A. Friedhofer
*Attorney, Agent, or Firm*—J. Gordon Lewis; Thomas N. Twomey

[57] ABSTRACT

A steering column switch that may be used as a gear shifting mechanism and can only be pivoted from its neutral position into one of its operating positions via a special manipulation. This measure prevents the transmission of a vehicle from being unintentionally shifted into gear or from changing from forward to reverse mode if the transmission is in gear. A prestressed holding element is provided in the steering column switch. This holding element locks the driver of the steering column switch in the neutral position until the holding element is moved into its unlocked position by pivoting the shift lever relative to the driver. In this position of the shift lever, the driver may be pivoted so as to shift the transmission.

7 Claims, 2 Drawing Sheets

STEERING COLUMN SWITCH IN THE FORM OF A GEAR SHIFT MECHANISM THAT CAN BE FIXED IN THE NEUTRAL POSITION

BACKGROUND OF THE INVENTION

In heavy motor vehicles, e.g., agricultural machines and construction vehicles, the transmission is frequently adjusted by means of an electric switch. In this case, forward or reverse mode, originating from a neutral position, is adjusted with the aid of a first switch, with the individual gears being shifted by means of a second switch once the driving direction has been selected.

Known steering column switches are able to realize switching processes in two orthogonal planes. Consequently, steering column switches of this type can be used for selecting the driving direction as well for shifting the desired gears. For example, there exist steering column switches that initiate shifting processes by pivoting the shift lever, with said steering column switches comprising a rotary handle on the end of the manually actuated shift lever which makes it possible to adjust the desired shifting positions independently of the pivoting position of the shift lever. Such a switch, in which the driving direction, for example, is adjusted by pivoting the shift lever and the individual gears are shifted by correspondingly turning the rotary handle, is, in principle, quite suitable for use as a gear shifting mechanism.

However, it is imperative to prevent the driving direction from being unintentionally changed by actuating the shift lever while the transmission is in gear.

SUMMARY OF THE INVENTION

The invention is based on a steering column switch. An objective of the invention consists of ensuring that the switch which determines the driving direction cannot be unintentionally actuated in such a steering column switch that is used as a gear shifting mechanism.

This objective is attained by assigning the actuation of the shift lever in a first plane to the selection of the desired driving direction, with the actuation of the shift lever in a second plane serving for moving the shift lever from a fixed neutral position into an operating position, in which the driving direction can be changed, against a prestress. The switch according to the invention only allows a change in the driving direction if the shift lever is held in an operating position against the resistance of a spring and a transversely directed control movement of the shift lever is simultaneously carried out against the resistance of additional spring means. Consequently, it is practically ruled out for the shift lever to be unintentionally moved in both directions simultaneously, i.e., the driving direction can only be changed intentionally.

The described steering column switch is particularly suitable as a gear shifting mechanism if it is also provided with a rotary switch that is installed in its handle such that the driving direction can be changed and the transmission can be shifted into the desired gear with only one hand. In this case, the previously described locking function is preserved.

It is, in principle, possible for a pin that is connected to the holding element to engage into a corresponding recess for the driver when the holding element is moved into its second position such that a pivoting movement of the driver about its axis is blocked.

In order to securely hold the driver if stronger forces are exerted upon said driver, the invention proposes the additional refinement.

In order to ensure that the holding element is securely guided in the housing of the switch, the invention proposes that the holding element is provided with lateral guide grooves that are guided in the housing by means of corresponding guide rails. These characteristics make it possible to ensure that the holding element cannot be pivoted and block the actuation of the gear shifting mechanism.

The principle described thus far can generally be applied to all switches that can only be actuated if a locking mechanism is simultaneously rendered ineffective. In order to make it possible to utilize the described switch as a gear shifting mechanism, the shift lever is held in a (central) neutral position, from which it may only be laterally pivoted in both directions if the lever is simultaneously pressed against a prestress. Certain switching processes may, for example, also be assigned to this neutral position. Consequently, the switch according to the invention is able to complete an additional circuit that is in the starter circuit of the motor in the neutral position. This means that the motor can only be started in the neutral position, i.e., the internal combustion engine can be prevented from starting in the forward or reverse mode of the transmission.

A particularly simple design of the gear shifting mechanism according to the invention is attained, if the switching mechanism is formed by a combination of microswitches, with one microswitch being assigned to each position of the shift lever. However, it would also be conceivable to actuate several microswitches simultaneously or in temporal dependence on one another by means of a special control profile on the control element.

In order to improve the guidance of the holding element under significant loads, the invention proposes to use metal as material for the driver, the holding and at least one section of the housing.

BRIEF DESCRIPTION OF THE DRAWINGS

One embodiment of the invention is described below with reference to the figures. Shown are.

DETAILED DESCRIPTION OF THE DRAWINGS

Figure 1:
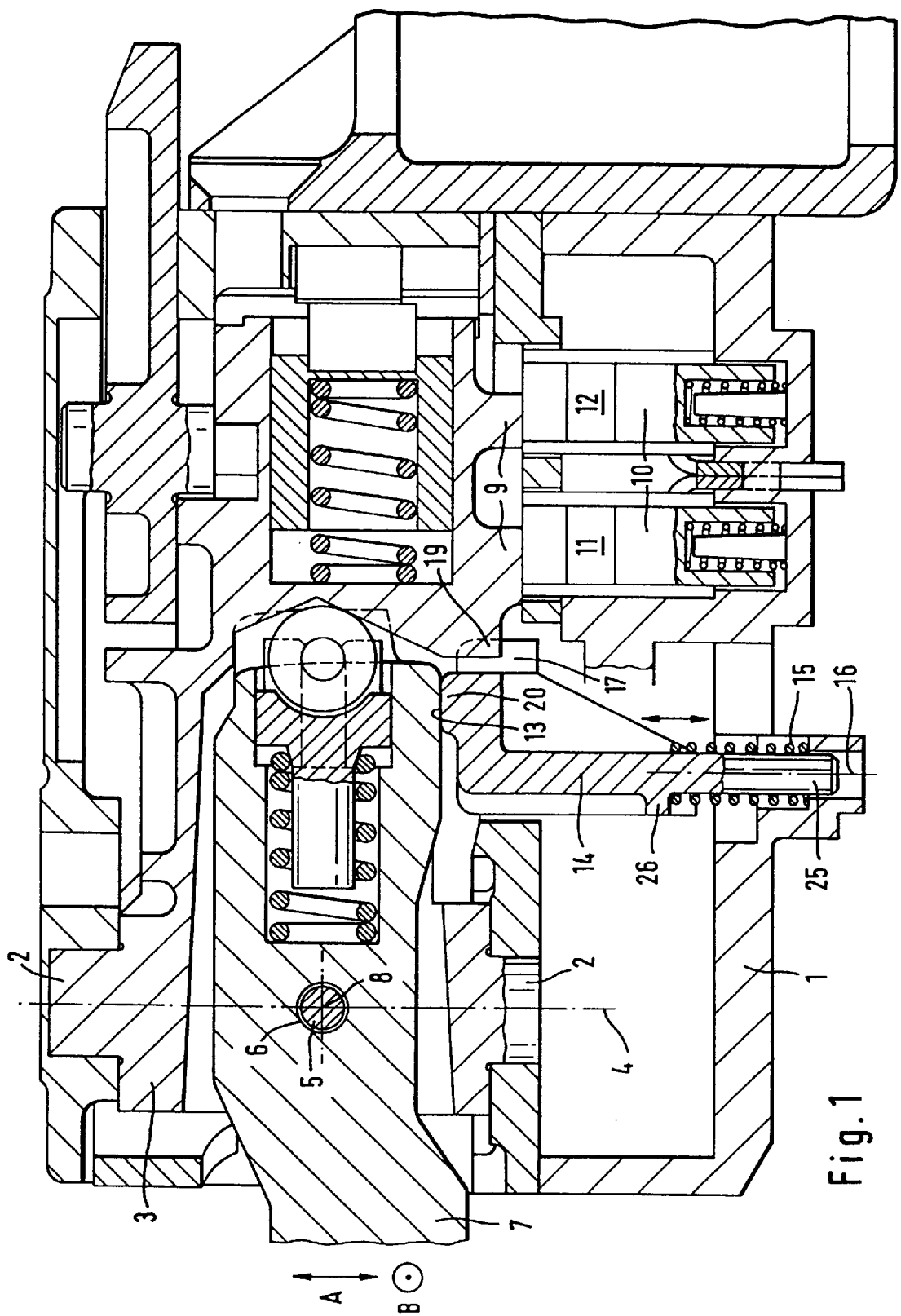
FIG. 1, a sectional representation of a switch according to the invention, in which the holding element is located in the locking position.

The switch shown in FIG. 1 is only described with respect to the aspects that are essential for understanding the invention. Details regarding additional characteristics of this switch can be obtained from DE-A-3,942,925 and DE-A-4,319,065. According to these documents, a driver 3 is arranged in rotatable fashion inside of a housing 1 that is composed of individual housing parts by means of two bearing pins 2 such that said driver 3 can be pivoted in the housing about its pivot axis 4.

A shift lever 7 engages into a bearing opening 6 via pivot pins 5 that are rigidly connected to the driver 3, such that the shift lever can be pivoted about its pivot axis 8. Consequently, the shift lever 7 can be moved in two orthogonal directions, i.e., in the direction of the double arrow A in FIG. 1 and perpendicular thereto in the direction of the arrow B. If the shift lever is pivoted in the direction B that extends perpendicular to the plane of projection in FIG. 1, the driver 3 is pivoted out of this plane and one or more switching elements 9 actuate a switching mechanism 10 that, for example, consists of the microswitches 11 and 12. In this case, the aforementioned pivoting movement may, for example, actuate switching plungers of the microswitches 11, 12 which are provided with suitable bevels. Certain switching states of the switching mechanism 10 may be assigned to the two end positions of the driver 3, in which the driver is pivoted out of its neutral position.

Figure 3:
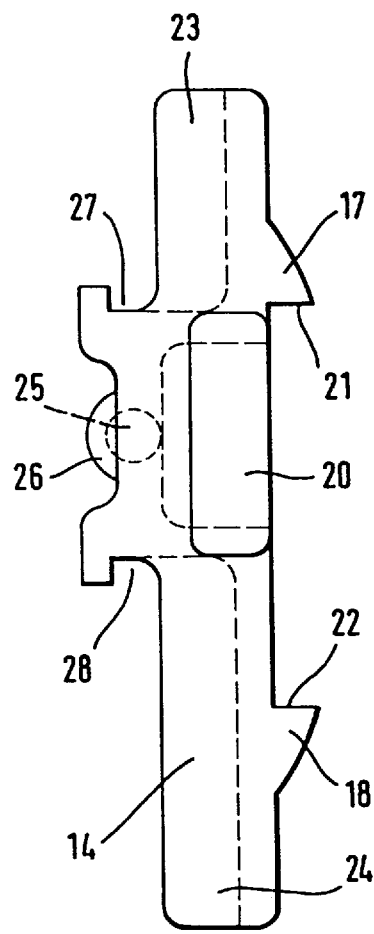
FIG. 3, a top view of the holding element according to FIG. 2.

If the shift lever 7 is pivoted upward about the axis 8 in the direction of the arrow A, the contact region 13 of the shift lever 7 travels downward a corresponding distance. A holding element 14 is arranged in the housing 1 beneath the contact region 13, such that it can be longitudinally displaced against the force of a holding spring 15. This holding element 14 can be displaced in the direction of its longitudinal axis 16. FIG. 3 shows that it is quite advantageous for the invention to provide the holding element 14 with two claws 17, 18 that engage on lateral wall regions 19. In the holding position shown in FIG. 1, the claws 17, 18 engage on opposing wall regions 19 of the driver 3 such that said driver cannot be pivoted out of its locked position by a force that acts upon the shift lever 7 in the direction B.

Consequently, the force exerted on the shift lever 7 remains ineffective because the shift lever 7 cannot move in the direction of the force with the driver held in place. This means that the switching mechanism 10 cannot be actuated by the driver 2 despite the effect of the force that acts in the direction B.

In order to cause a change in the switching state of the switching mechanism 10 by means of the force that acts in the direction B, the shift lever 7 must be previously pivoted about its pivot axis 8. This is realized by pulling the shift lever upward in the direction of the arrow A in FIG. 1. This causes the contact region 13 to be pressed downward, with said contact region acting upon the actuating projection 20 of the holding element 14 and displacing said holding element downward against the force of the spring 15. Consequently, the claws 17, 18 are disengaged from the wall regions 19 of the driver 3, i.e., the driver 3 can be pivoted about the axis 4 of the bearing pins 2. The effect of a force that acts in the direction B consequently causes a corresponding pivoting movement of the driver 3 as well as the actuation of the switching mechanism 10.

If the indicated steering column switch is used as a gear shifting mechanism, the shift lever 7 cannot be unintentionally displaced in the direction B from its neutral position according to FIG. 1, i.e., the shifting mechanism 10 of the transmission cannot be actuated and the vehicle cannot be shifted into forward or reverse mode. If the transmission must be shifted into forward or reverse mode, the shift lever 7 must be previously pulled upward in the direction of the arrow A, whereafter the desired pivoting movement can be carried out.

Figure 2:
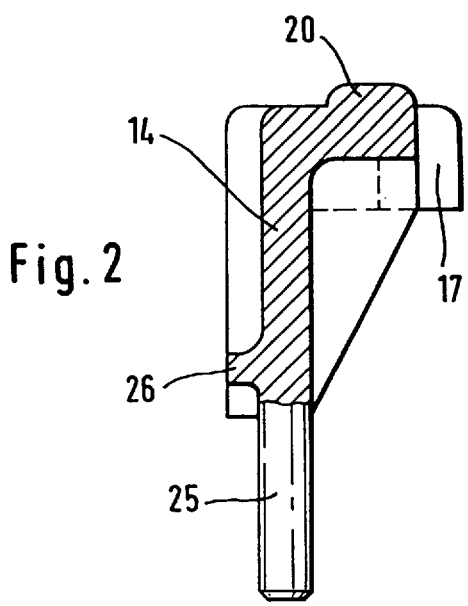
FIG. 2, the holding element in the position shown in FIG. 1.
Figure 4:
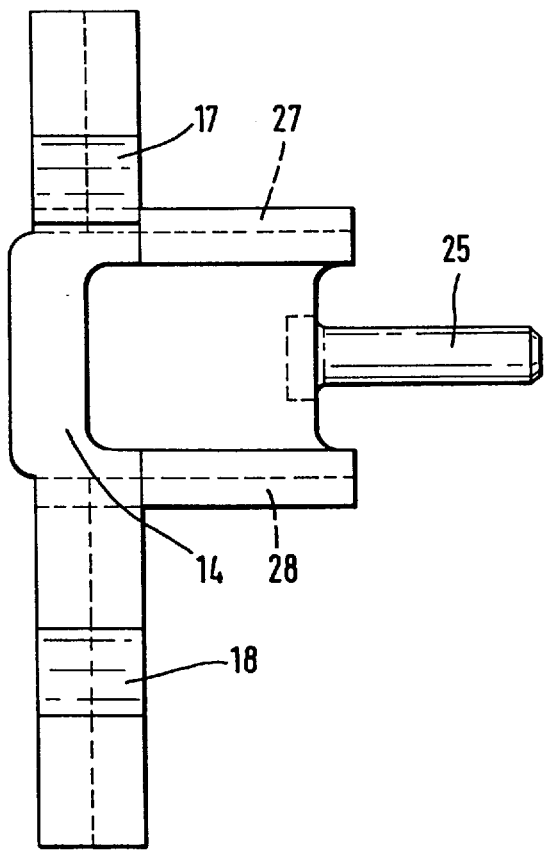
FIG. 4, a side view of the holding element according to FIG. 3.

FIGS. 2–4 show details of the holding element 14. For example, FIG. 3 shows the contours of the contact surfaces 21, 22 of the claws 17, 18 that hold the driver in its position while the holding element is locked.

The holding element additionally comprises two support projections 23, 24 that serve for supporting the holding element on the housing wall, i.e., the guidance of the holding element 14 in the interior of the switch housing is improved. The corresponding housing parts as well as the holding element are manufactured of metal.

FIGS. 2 and 3 show an additional actuating projection 20 on the holding element 14 which is designed in such a way that the movement of the contact region 13 on the actuating projection 20 takes place with the least possible friction. The holding element 14 additionally comprises a guide pin 25 that improves the guidance of the holding element 14 in the housing (see FIG. 1) and also prevents the collapse of the spring 15. In the holding element 14, a semicircular limit stop 26 that serves as a support for the spring 15 on the holding element 14 is provided. The other end of this spring is supported on a shoulder of the housing 1. The holding element additionally comprises two guide grooves 27, 28. Corresponding projections of the housing engage into these grooves and consequently ensure the secure guidance of the holding element inside of the housing in the direction that extends perpendicular to the plane of projection in FIG. 3.

One particular advantage of the invention is described below. In many steering column switches, an additional switching mechanism that is actuated with the previously described unlocking movement of the shift lever 7 is installed at the location of the holding element. Consequently, it is merely required to replace this additional switching mechanism with a holding element in these known steering column switches so as to obtain a conventional steering column switch with the above-mentioned properties which can be used as a gear shifting mechanism.

One particular advantage of the invention is described below. In many steering column switches, an additional switching mechanism that is actuated with the previously described unlocking movement of the shift lever 7 is installed at the location of the holding element. Consequently, it is merely required to replace this additional switching mechanism with a holding element in these known steering column switches so as to obtain a conventional steering column switch with the above-mentioned properties which can be used as a gear shifting mechanism.

We claim:

1. A steering column switch with a shift lever that is arranged in a switch housing such that the shift lever can be pivoted about a first axis, wherein said shift lever is supported in the switch housing inside of a driver that is arranged in the switch housing such that the drive can be pivoted about a second axis that extends perpendicular to the first axis, and wherein said driver carries a switching element that cooperates with a switching mechanism that is rigidly connected to the housing, wherein a holding element that can be displaced in the housing engages on the shift lever with a prestress and holds said shift lever in a rest position in a first pivoting position, wherein the holding element engages on the driver in the first position of the holding element and thus prevents a pivoting movement, and that the holding element is moved into a second position in which the holding element releases the driver against the prestress by pivoting the shift lever about the first axis into the second position.

2. The steering column switch according to claim 1, wherein the holding element comprises lateral claws that hold the driver on both sides in the first position of the holding element.

3. The steering column switch according to claim 1, wherein the holding element is provided with lateral guide grooves that are guided in the housing by means of corresponding guide rails.

4. The steering column switch according to claim 1, wherein the driver is held in a neutral position by the holding element, and that said driver can be pivoted into two operating positions that respectively lie to the side of the neutral position by means of the shift lever in the unlocked condition.

5. The steering column switch according to claim 4, wherein the switching mechanism is formed of microswitches that are actuated in the respective operating positions of the driver.

6. The steering column switch according to claim 1, wherein the driver, the holding element and at least one section of the housing are manufactured of metal, and that the side walls of the holding element are supported on this housing section.

7. The steering column switch according to claim 1, wherein the shift lever is provided with a rotary switch on an end that is located opposite the driver.

* * * * *